A. D. ANDERSON.
SEED DROPPING MECHANISM FOR PLANTERS.
APPLICATION FILED OCT. 7, 1913.
1,109,500.
Patented Sept. 1, 1914.
2 SHEETS—SHEET 1.
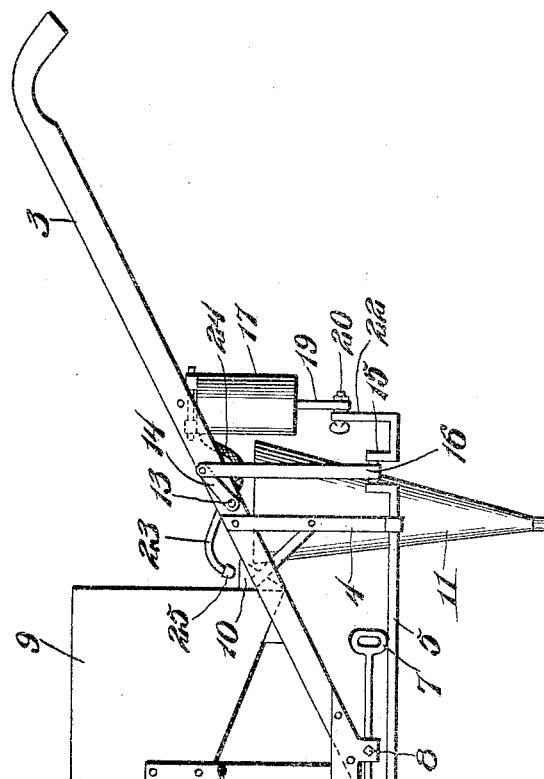
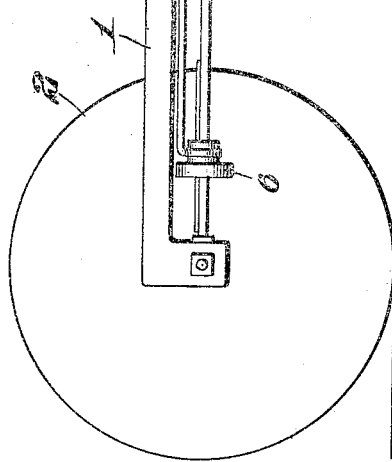
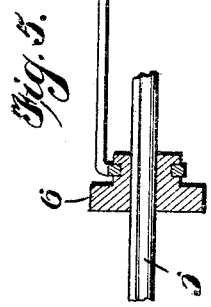
Witnesses
J. R. Heinrichs
K. Peacock
Inventor
Albert D. Anderson
By Victor J. Evans
Attorney

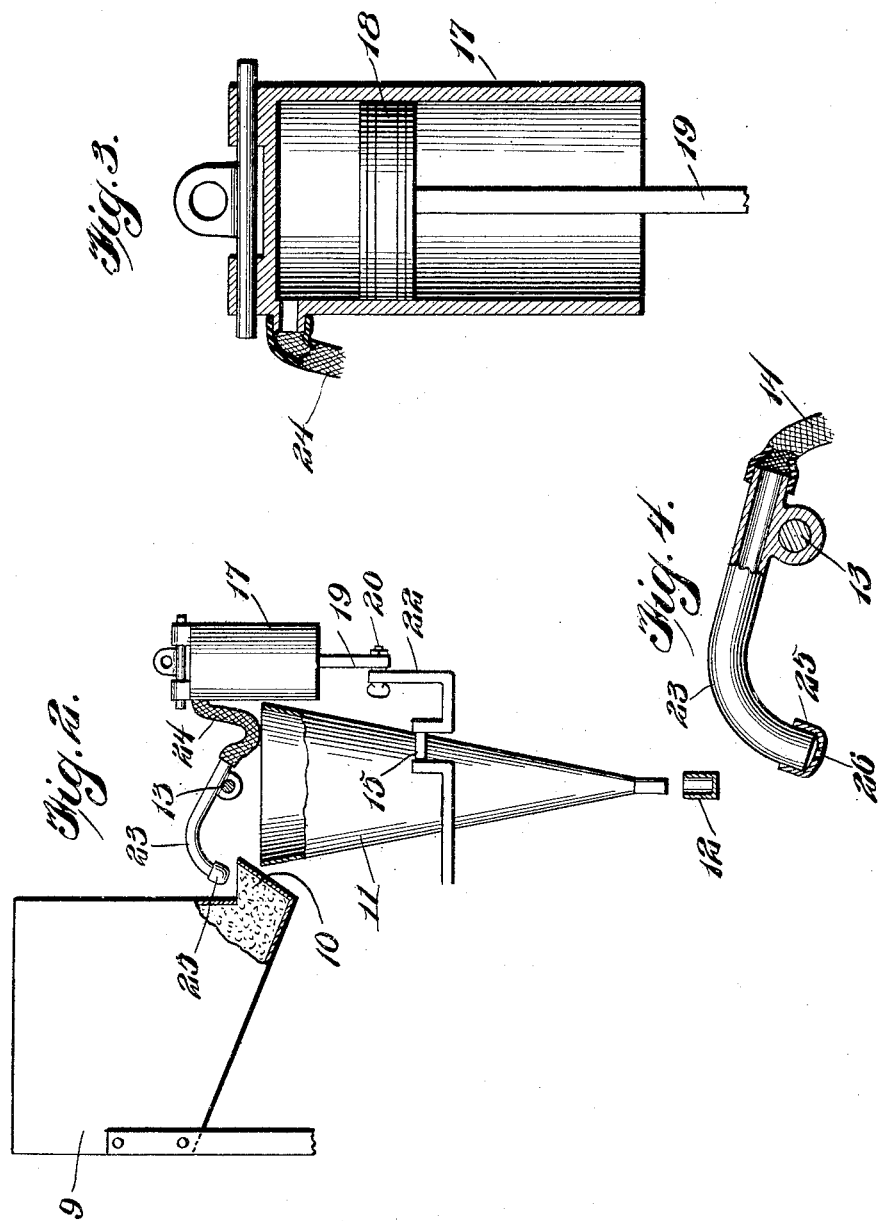

UNITED STATES PATENT OFFICE.

ALBERT D. ANDERSON, OF DULUTH, MINNESOTA.

SEED-DROPPING MECHANISM FOR PLANTERS.

1,109,500.  Specification of Letters Patent.  Patented Sept. 1, 1914.

Application filed October 7, 1913. Serial No. 793,911.

*To all whom it may concern:*

Be it known that I, ALBERT D. ANDERSON, a citizen of the United States, residing at Duluth, in the county of St. Louis and State of Minnesota, have invented new and useful Improvements in Seed-Dropping Mechanism for Planters, of which the following is a specification.

This invention has relation to seed dropping mechanisms for planters and it consists in the novel features hereinafter described and claimed.

The object of the invention is to provide a dropping mechanism especially adapted to separate soil seed from a quantity of seed and drop the same singly at desired intervals.

With this object in view the mechanism includes a hopper provided with a seed cup into which the seed may gravitate. The hopper is mounted upon the frame of a planter and a suction cup is also mounted upon the same. Means is provided for operating the suction pump at a desired rate of speed from the supporting wheel of the planter. A pipe is pivotally mounted upon the frame of the planter and is operatively connected with the said suction pump. The pipe is provided at one end with a cap having an opening slightly less in diameter than the diameter of the seed. This pipe is so arranged that as it swings upon its pivot the said cap is carried down into the seed cup and at the same time suction is created through the pipe whereby one of the seed is drawn against the edges of the opening in the cap. The pipe is then swung so that the cap is carried above and beyond the seed cup and at the same time the suction draft through the pipe is interrupted and a force draft is substituted said force draft being driven by the pump. This will thrust the seed away from the opening in the cap and the seed is permitted to fall through a chute to the ground. The said pipe is also operated from the supporting wheel of the planter.

In the accompanying drawings:—Figure 1 is a side elevation of the seed dropping mechanism applied to a planter. The remaining Figs. 2 to 6 are detail views of the features of the device.

The planter to which the seed dropping mechanism is applied comprises a frame 1 which is mounted upon a supporting wheel 2 and which is also provided with handles 3. A bracket 4 depends from one of the handles 3 and a shaft 5 is journaled at its forward end in the frame 1 and at its rear portion in the bracket 4. A disk 6 is splined upon the shaft 5 and may be moved longitudinally of the shaft. The said disk 6 bears against the side of the supporting wheel 2 and is rotated by the said supporting wheel as the planter is moved over the soil. A handle 7 is slidably mounted in the frame 1 and engages the disk 6 and by moving the said handle 7 longitudinally the disk 6 may be moved along the shaft whereby the said disk may be caused to contact with the wheel 2 at points more or less remote from the center thereof so that the rate of speed at which the shaft 5 is rotated with relation to the rate of speed of the rotation of the wheel 2 may be adjusted. Any suitable securing means as for instance that shown at 8 may be provided for holding the handle 7 at an adjusted position with relation to the frame 1. A hopper 9 is mounted upon the handles 3 and is provided at one side and in the vicinity of its lower end with a seed cup 10 into which seed may gravitate from the said hopper. A chute 11 is carried by the handles 3 behind the hopper 9 and the said chute is provided with a detachable cap or closure 12. A shaft 13 is journaled upon the handle 3 and is provided at one edge with a crank arm 14. The shaft 5 is provided with a crank 15 and a pitman 16 operatively connects the crank 15 with the crank arm 14. A pump cylinder 17 is pivotally connected with the handles 3 and a piston 18 is slidably mounted in the said cylinder. A piston rod 19 is operatively connected with the said piston and at its lower end is connected with a bolt 20 which is adjustably mounted in a slot 21 provided in an arm 22 carried at the rear end of the shaft 5. A pipe 23 is fixed to the shaft 13 and a flexible tube or hose 24 connects one end of the pipe 23 with the upper end portions of the pump cylinder 17. A cap 25 is carried at one end of the pipe 23 and the said cap is provided with a relatively small opening 26.

The parts are so arranged that as the shaft 13 is rocked one end of the pipe 23 is dipped down into the seed cup 10 and at the same time suction draft is created through the pipe 23 from the pump cylinder 17 in view of the fact that the piston 18 at this time is moving in a downward direction. Therefore the suction draft through the pipe 23 and the opening 26 in the cap 25 will draw one of the seeds from the cup 10 against the opening 26 in the cup 25. After this takes place the shaft 13 rocks so that the cup 25 is carried up and away from the pump 10 but remains over the upper end of the chute 11. When upon the return stroke of the piston 18 a forced draft is created in the pump cylinder 17 the said blast passes through the hose or tube 24 and pipe 23 and thus the seed which has been held by suction against the opening 26 is forced away from the same and drops down through the chute 11 to the ground. Therefore it will be seen that seeds of small dimensions may be readily separated from quantities of the seed and thus the said seed may be dropped individually.

Of course during the dropping operation it is to be understood that the closure 12 is removed from the lower end of the chute 11. This closure 12 is merely applied to the lower end of the chute 11 when it is desired to determine whether or not the dropping mechanism is dropping one seed only. By applying the closure at such times and operating the device and then examining the number of seeds which will be found in the closure 12 at the end of each operation it is accurately determined whether or not the mechanism is selecting the proper or desired number of seeds.

Having described the invention what is claimed is:—

1. In combination with a seed receptacle a seed dropping mechanism comprising a shaft mounted for rocking movement, a seed pickup mounted upon the shaft, a pump cylinder pivotally mounted, a flexible hose connecting the cylinder with said seed pickup and means for operating the pump and for rocking the shaft.

2. In combination with a seed receptacle a seed dropping mechanism comprising a shaft journaled adjacent the receptacle, a seed pickup carried by the shaft, a pump pivotally mounted adjacent the shaft and operatively connected with the seed pickup a supporting wheel for the receptacle, a shaft journaled adjacent the supporting wheel and operatively connected with the first mentioned shaft and the pump and a disk slidably mounted upon the last mentioned shaft and having frictional engagement with the said supporting wheel.

3. In combination with a planter having a supporting wheel, a hopper and a chute, a pump mounted upon the planter, a seed pickup mounted upon the planter and adapted to move from the receptacle to the chute, means for operating the seed pickup from the said supporting wheel and adjustable means for operating the pump from the supporting wheel.

In testimony whereof I affix my signature in presence of two witnesses.

ALBERT D. ANDERSON.

Witnesses:
GUST BERGMAN,
AUGUST WILLGREN.

Copies of this patent may be obtained for five cents each, by addressing the "Commissioner of Patents, Washington, D. C."